United States Patent [19]
Gnielka et al.

[11] Patent Number: 5,661,672
[45] Date of Patent: Aug. 26, 1997

[54] PROCESS FOR MASK IRRELEVANT MEASURED VALUES IN AN UNBALANCE MEASURING SIGNAL

[75] Inventors: Peter Gnielka; Volker Tews, both of Darmstadt; Volker Guyot, Buttelborn, all of Germany

[73] Assignee: Schenck RoTec GmbH, Germany

[21] Appl. No.: 484,474

[22] Filed: Jun. 7, 1995

Related U.S. Application Data

[63] Continuation-in-part of Ser. No. 223,536, Apr. 5, 1994, abandoned.

[30] Foreign Application Priority Data

Jul. 6, 1993 [EP] European Pat. Off. .............. 93109114

[51] Int. Cl.⁶ ............................................ G01M 1/14
[52] U.S. Cl. .......................... 364/572; 364/463; 364/508; 73/66; 73/460; 73/462
[58] Field of Search .............................. 73/460–462, 457, 73/66; 364/508, 463, 551.01, 551.02, 566, 572, 724.1; 455/296, 307, 63; 395/3, 50, 61

[56] References Cited

U.S. PATENT DOCUMENTS

| | | | |
|---|---|---|---|
| 4,015,480 | 4/1977 | Giers | 73/462 |
| 4,109,312 | 8/1978 | Beutel | 364/508 |
| 4,338,818 | 7/1982 | Hill et al. | 73/462 |
| 4,345,472 | 8/1982 | Hara et al. | 73/462 |
| 4,484,474 | 11/1984 | Maus | 73/462 |
| 4,830,020 | 5/1989 | Ruth | 128/691 |
| 4,926,341 | 5/1990 | Guyot | 364/508 |
| 5,105,372 | 4/1992 | Provost et al. | 364/551.01 |
| 5,285,279 | 2/1994 | Sakamoto et al. | 348/614 |
| 5,311,446 | 5/1994 | Ross et al. | 364/508 |
| 5,406,846 | 4/1995 | Gasch et al. | 73/462 |
| 5,421,199 | 6/1995 | Himmler | 73/462 |
| 5,488,861 | 2/1996 | McConnell et al. | 73/462 |

*Primary Examiner*—James P. Trammell
*Assistant Examiner*—Tony M. Cole
*Attorney, Agent, or Firm*—Connolly & Hutz

[57] ABSTRACT

A process masks non-relevant measured values in an unbalance signal consisting of a large number of individual measured values and a circuit arrangement determines the unbalance of a rotatable object in at least one measuring plane with at least one oscillation transducer and one angle position pick-up for processing the unbalance measuring signal. A display device displays the unbalance in terms of position and magnitude and/or a processing device further processes the unbalance, in order for a system based on fuzzy logic to take into account any unexpected interferences during the formation of the unbalance measured value. In the case of greatly deviating individual measured values, a system based on fuzzy logic which recognizes the course of the unbalance measuring signal that can be roughly expected masks these values as non-relevant.

7 Claims, 9 Drawing Sheets

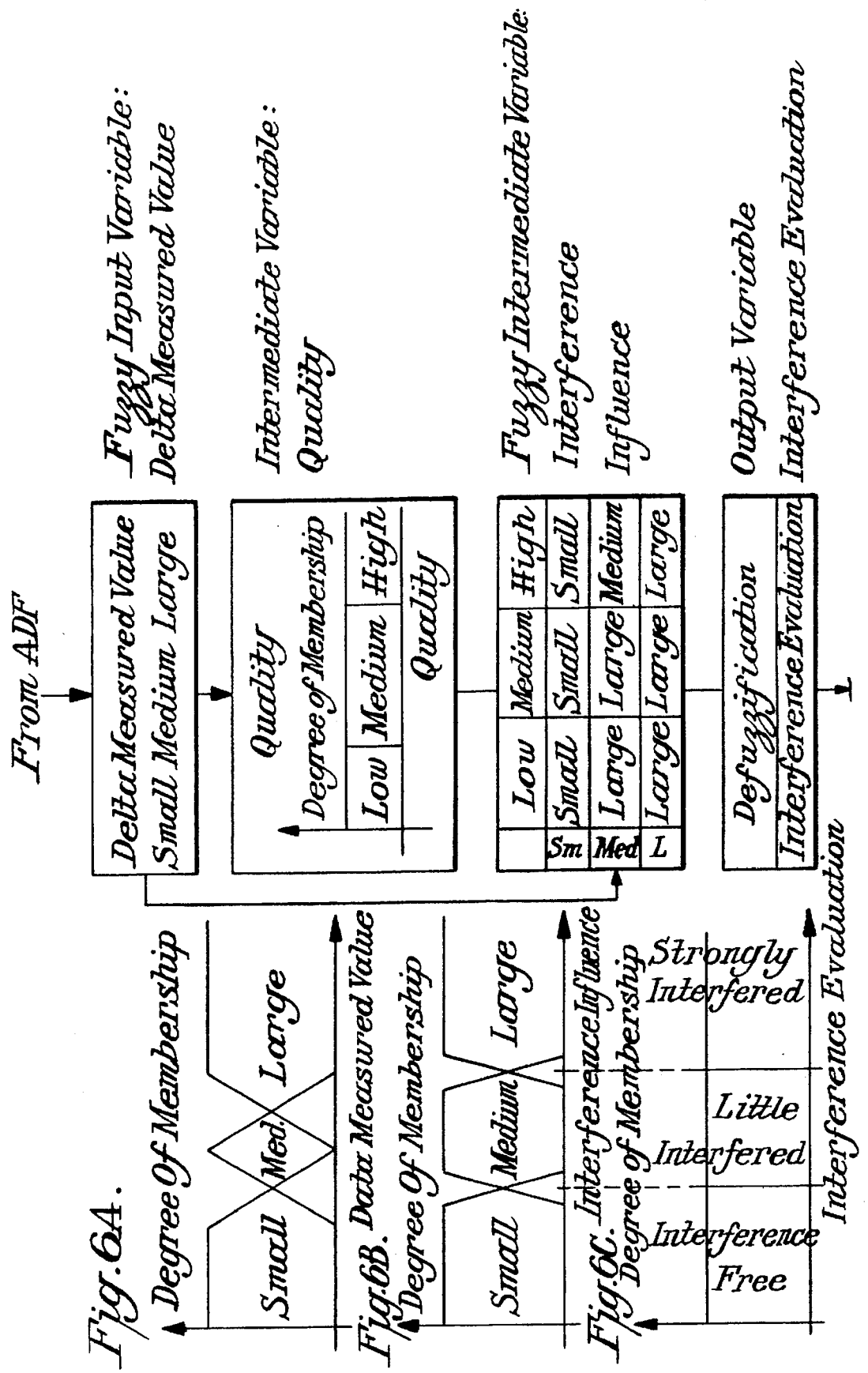

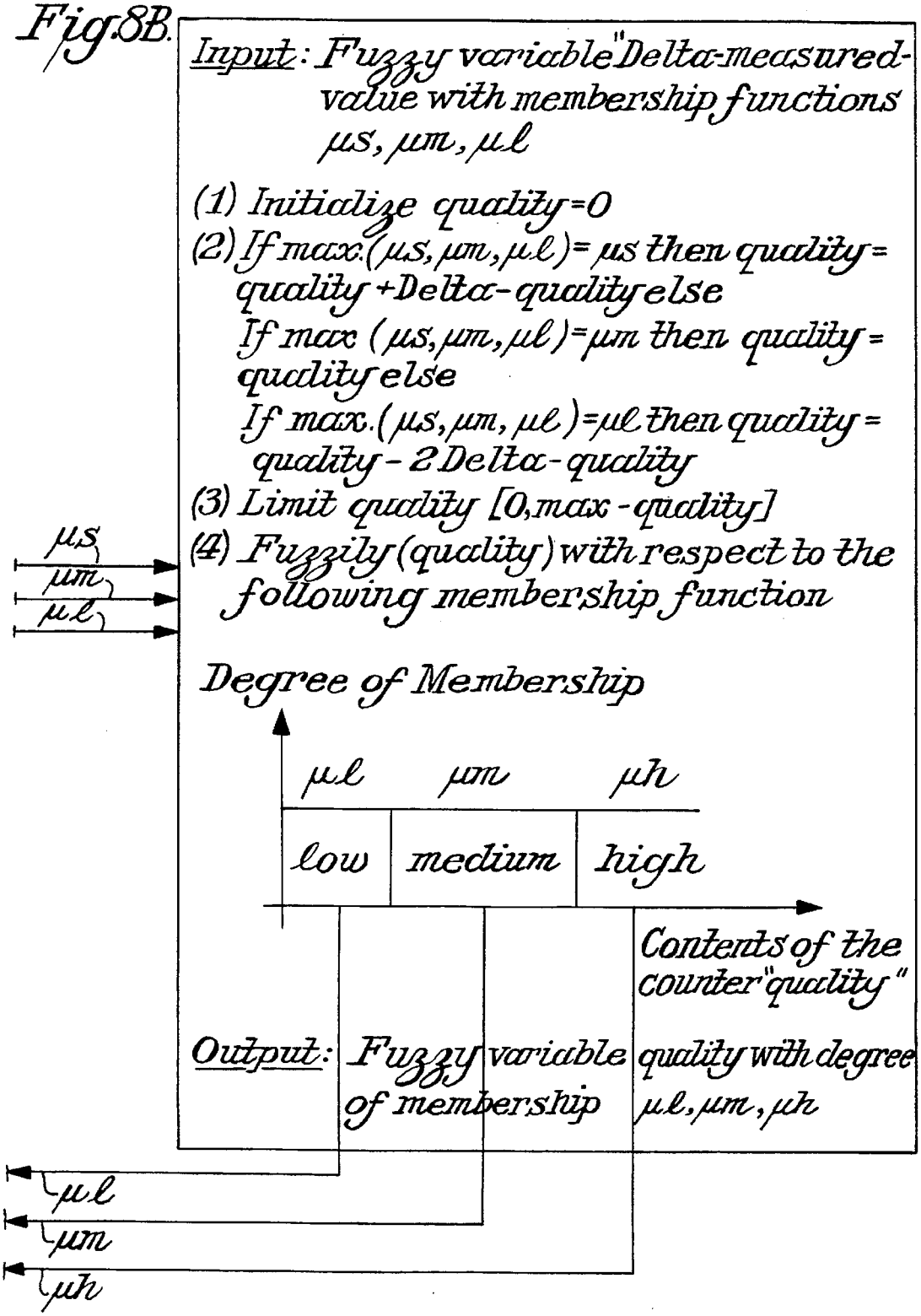

PROCESS FOR MASK IRRELEVANT MEASURED VALUES IN AN UNBALANCE MEASURING SIGNAL

CROSS-REFERENCE TO RELATED APPLICATIONS

The present application is a continuation-in-part of application Ser. No. 08/223,536, filed Apr. 5, 1994, abandoned Oct. 12, 1995.

BACKGROUND OF THE INVENTION

The present invention relates to a process to mask non-relevant measured values in an unbalance signal consisting of a large number of measured values as well as a circuit arrangement for carrying out the process.

In determining the unbalance of an object in terms of angle position and magnitude, an attempt is made to determine exclusively the oscillations caused by the effect of the unbalance and their position with respect to a reference point as free of error as possible. The oscillations stemming from the unbalance, however, are always superposed by so-called interference oscillations which can be caused, for example, by processing machines, by passing transportation units, by impact on the machine, and by the drive motor as well as by the bearings of the balancing machine itself. These interferences can strongly falsify the result of the unbalance measurement. In order to mask such interference oscillations, which also include oscillations that occur during the acceleration or deceleration of the object to be balanced, until now the entire measuring range has been divided into a start-up phase in which no measurements were made, a measuring phase in which the unbalance effects and their position with respect to a reference point were picked up and which extended over a certain period of time, followed by the braking phase during which likewise no measurements were made (German patent A-16 48 336).

In another method (German patent A-33 42 542), in order to avoid interference oscillations, the entire measuring procedure was not evaluated if it turned out that the unbalance measurement had been affected by interference oscillations caused by outside influences.

With the measurements carried out according to the state of the art, in the case of German patent A-16 48 336, it cannot be ruled out that, due to unexpected interference effects during the measuring cycle, an erroneous measurement will occur because of which, especially with mass production, a rotatable object measured under these circumstances will be rejected as unusable, even though the unbalance present in the object still falls within a range that would have allowed the object to be used. Such erroneous measurements occur not only with the measurement of mass-produced goods which are balanced in one or two planes, but also with rotatable components, for example, vehicle wheels with tires, which have to be adjusted or completely balanced again at regular intervals in order to eliminate oscillations in the vehicle caused by the unbalance.

In the case of German patent A-33 42 542, the complete measured result is canceled if a permissible interference variable is surpassed, but this necessarily requires another measurement for which it likewise cannot be ruled out that interference variables will not re-occur, thus once again leading to the cancellation of the measured value. This automatically leads to unacceptably time-consuming measurement procedures.

Moreover, with both of these measuring methods, it is not possible to determine interference oscillations, especially in the start-up phase, which can continue on into the measuring phase, thus causing an erroneous measurement, and to mask them as non-relevant measured values.

SUMMARY OF THE INVENTION

In this light, the invention is based on the objective of using a system based on fuzzy logic to take into account any unexpected interferences during the determination of the unbalance effects of a rotatable object.

This objective is achieved with the inventive characteristics of the present process. Here, the system based on fuzzy logic recognizes the course of the unbalance measuring signal that can be roughly expected, which is represented as a sinusoidal oscillation and it then intervenes in the measuring procedure when the roughly expected course of the unbalance measuring signal is disturbed by greatly deviating individual measured values in such a way that the individual measured values—as non-relevant measured values—cannot even be taken into consideration for determining the unbalance effect, but rather are to be masked. The measuring procedure itself, however, continues and the masking is ceased or reduced once the deviation of the individual measured value shows a tendency to move back into the permissible range of the expected course. The result of this is, first of all, that no erroneous measurement occurs in the unbalance effect and secondly, that the determination time for the unbalance effect is not affected since greatly deviating individual measured values are eliminated. Moreover, this inventive process may be used in the start-up phase of a balancing machine, when errors can occur that still continue to have an impact during the actual measurement. For example, error can arise due to malfunctions in the power supply or during the braking of the object to be examined after the measuring procedure has been completed. Delayed release of a brake after the balancing machine starts up again may cause such errors. In such a case, the delayed release of a brake, the system based on fuzzy logic would also have the possibility, for example, to immediately stop the drive motor of a balancing machine without carrying out a measurement process.

In one embodiment the system based on fuzzy logic permits an unsharp band width of the possible course of the unbalance measuring signal. The system can be used when a certain residual unbalance is allowed to remain, even during the operation of the balanced rotatable object, without an operational malfunction occurring.

In this case, an optimization of the unbalance results are achieved with the system based on fuzzy logic.

In another embodiment of the subject matter of the invention it is proposed that the system based on fuzzy logic should carry out an unsharpness selection procedure after the beginning of the measurement during an essentially constant amplitude course of the values to be expected in consecutive measurement runs, in order to ascertain whether the individual amplitude measured value is permissible for the formation of the unbalance measuring signal. This process rule according to the invention is used when other means have already provided assurance that, during the speed-up time and during the braking time, there is no need for monitoring with a system based on fuzzy logic. The rotatable objects whose unbalance effect is measured by this method according to the invention are especially characterized by the fact that interference oscillations do not declare any rotatable object to be a reject when its unbalance effects still lie within the permissible unbalance effect.

In another embodiment of this process, it is proposed that the measured value can still be modified as a function of the system based on fuzzy logic. Thus, the band width of the permissible residual unbalance can be considerably reduced while maintaining the same quality and without additional time being needed.

On the basis of a circuit arrangement to determine the unbalance of a rotatable object in at least one measuring plane with at least one oscillation transducer and one angle position pick-up for processing the unbalance measuring signal, a display device for displaying the unbalance in terms of position and magnitude and/or a processing device to further process the unbalance, to carry out the process of the invention. The inventiveness is seen in the fact that the unbalance measuring signals stemming from the oscillation transducer are immediately processed by the system based on fuzzy logic.

As a result, the unbalance raw values stemming from an oscillation transducer, which can also be a force measurement by means of piezo pick-ups or an oscillation position sensor, are immediately processed by the system based on fuzzy logic; therefore, interference effects cannot occur.

The process can also be carried out on the basis of a circuit arrangement to determine the unbalance of a rotatable object in at least one measuring plane with at least one oscillation transducer and one angle position pick-up for processing the unbalance measuring signal, a display device for displaying the unbalance in terms of position and magnitude and/or a processing device to further process the unbalance in that there is at least one adapter amplifier for the unbalance measuring signal between the output of the oscillation transducer and the input of the system based on fuzzy logic.

The process according to the invention can also be carried out on the basis of a circuit arrangement to determine the unbalance of a rotatable object in at least one measuring plane with at least one oscillation transducer and one angle position pick-up for processing the unbalance measuring signal, a display device for displaying the unbalance in terms of position and magnitude and/or a processing device to further process the unbalance, in that, first of all, the information stemming from the oscillation transducer is conveyed via a system based on fuzzy logic to a device for measured value processing, and secondly, the information from the oscillation transducer is conveyed via an adapter amplifier and/or a pre-filter to the device for measured value processing and in that the measured value processing is done as a function of the values influenced by the fuzzy logic. The result is that, first of all, in the device for measured value processing, the system based on fuzzy logic is used and consequently, any erroneous variables in the processing string are not taken into consideration, since the system based on fuzzy logic deals with the unexpected interference effects completely separately from the processing string in the device for measured values processing.

In one embodiment of the circuit arrangement, there is a buffer device connected between the value processed by fuzzy logic and the device to process the measured values, a buffer device connected between the values coming via the adapter amplifier and the pre-filter and the device to process the measured values, and there is a buffer device connected between the values coming from the angle position pick-up and the device to process the measured values. Connecting such a buffer arrangement in every string for measured value processing is especially advantageous when the measuring procedure for the rotating object takes place in a different place than its processing procedure does; such a buffer arrangement can also serve to coordinate different working speeds in the various strings with each other.

In one embodiment of this circuit arrangement it is proposed that, after the adapter amplifier, of which there is at least one, there should be another device for pre-filtering and that the output of this device emitting the unbalance measuring signal thus prepared should be connected to the system based on fuzzy logic in order to process this unbalance measuring signal. By means of the use according to the invention of an adapter amplifier, the output voltage of the oscillation transducer can be adapted to the system based on fuzzy logic and the use of pre-filtering is especially suitable to enable digital filtering (antialiazation).

By means of the invention, it becomes possible for the first time to clearly eliminate from the unbalance of the rotatable object any interferences exerted from the outside onto the balancing machine such as, for example, a fork-lift truck driving past, the start-up of drilling on a compensation machine linked to the balancing machine, without the need to carry out new measuring cycles and without substantially increasing the measuring time.

BRIEF DESCRIPTION OF THE DRAWINGS

Novel features and advantages of the present invention in addition to those noted above will become apparent to persons skilled in the art from a reading of the following detailed description in conjunction with the accompanying drawings wherein similar reference characters refer to similar parts and in which.

DETAILED DESCRIPTION OF THE INVENTION

Figure 1:
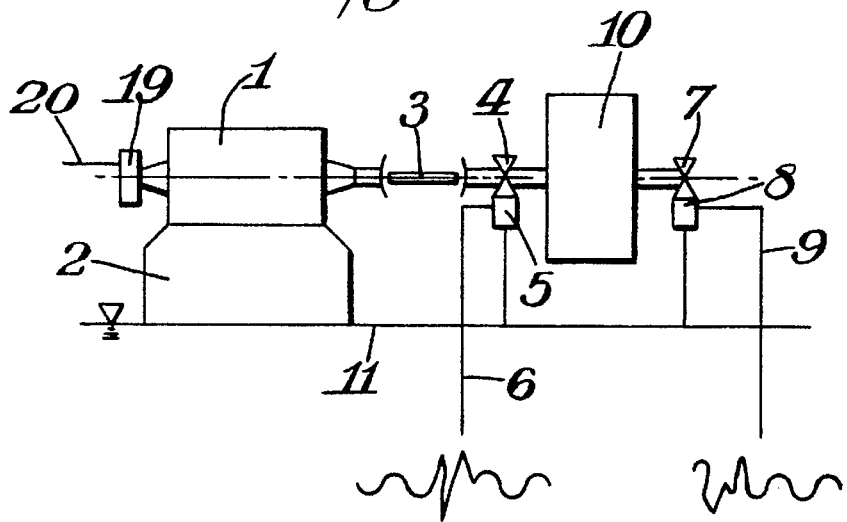
FIG. 1 is a schematic representation of the essential components of a balancing machine consisting of a motor, angle position pick-up, coupling, bearings and oscillation transducers, and including the object to be balanced.
Figure 2A:
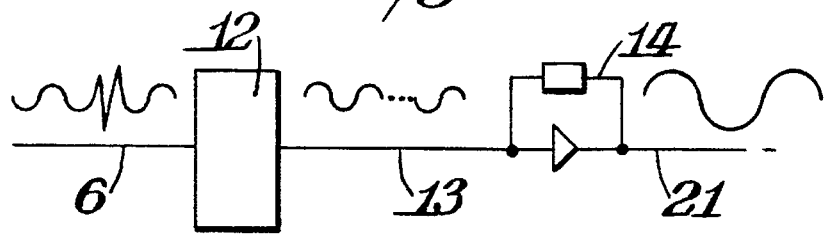
FIG. 2a is a signal provided by the oscillation transducer processed by the system based on fuzzy logic and conveyed to an adapter amplifier.
Figure 2B:
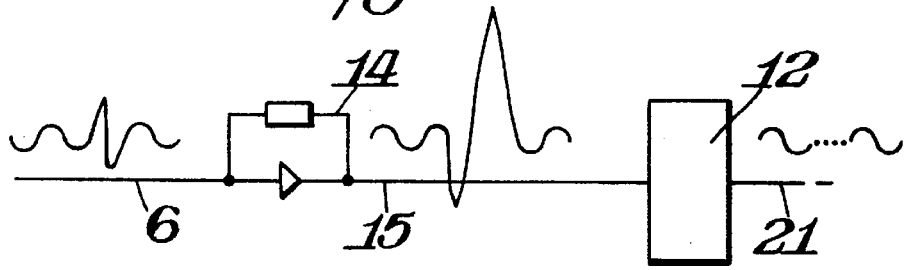
FIG. 2b is a signal adapted by the adapter amplifier which is subsequently further processed by a system based on fuzzy logic.
Figure 2C:
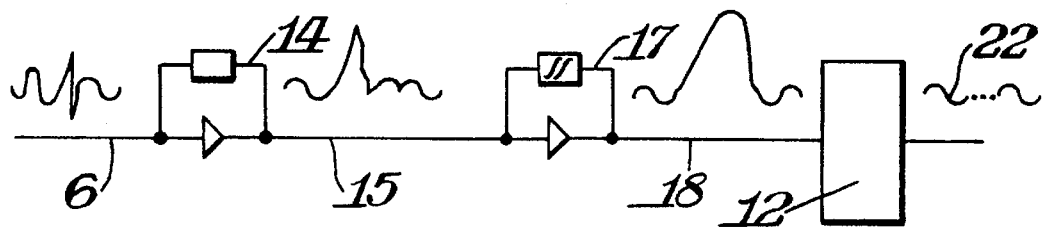
FIG. 2c is a signal obtained by the adapter amplifier and the pre-filter which is subsequently further processed by a system based on fuzzy logic.

Referring in more particularity to the drawings, in the embodiment example according to FIG. 1, a drive motor 1 which is standing on a pedestal 2 on a foundation drives a rotatable object 10 via a connection shaft 3. The rotatable object 10 is supported in a left-hand bearing 4 and in a right-hand bearing 7. A left-hand oscillation transducer 5 is associated with the left-hand bearing 4 and a right-hand oscillation transducers 8 is associated with the right-hand bearing 7. The oscillation transducer can be force, path, speed or acceleration pick-ups which transmit their signals to devices for further processing. Thus, the left-hand oscillation transducer 5 transmits a measuring signal to the left at 6 and the right-hand oscillation transducer 8 transmits a measuring signal to the right at 9. The further processing of the measuring signals is shown in greater detail in FIGS. 2a through 2c and in 3a and 3b. Essentially, the further processing of the measuring signal on the left at 6 is shown in FIGS. 2a through 2c and in 3a and 3b. The same processing is also carried out for the measuring signal on the right at 9 when dealing with a two-plane balancing procedure.

Instead of the balancing described in this embodiment according to FIG. 1, the process according to the invention can also be used for multiple-plane balancing as well as for balancing cardan shafts or else for balancing flexible rotors.

Instead of the balancing device with a two-plane balancing procedure shown in the embodiment according to FIG. 1, a one-plane balancing procedure can also be carried out for narrow rotation objects.

FIG. 2a, for example, shows the measuring signal on the left at 6 which, in addition to the sinusoidal curve shown there consisting of individual measured values, has a substantial peak caused by an interference in the signal course. This peak does not come from the unbalance oscillations which are present in the rotatable object 10, but rather this interference oscillation or this interference pulse can be caused by a fork-lift truck driving past the balancing machine or by the placement of a heavy piece of equipment near the balancing machine or, for example, in the case of wheel balancing machines, by a mechanical force on the stand of the wheel balancing machine.

Instead of just one interference, it is also possible for several interferences to occur consisting of several interference oscillations or interference pulses.

Such interferences were eliminated according to the state of the art in that, in such instances, the entire measurement was interrupted and had to be repeated from the start again, which automatically led to a prolongation of the measuring procedure.

The measuring signal on the left at 6 provided with the interference signal is now transmitted to a system based on fuzzy logic 12. There, the interference pulse which extends beyond the band is processed in such a way that, for example, as a function of the fading away of the interference oscillation, further processing can already get under way, even if the limit of the band range has not yet been reached from the outside. Thus, the on-going measurement is not annulled in its entirety as an erroneous measurement, but rather a shortening of the measuring time is achieved in comparison to the generally known method.

It is conceivable that, even in the start-up phase for the balancing machine, i.e. before the measurement speed is reached, interference oscillations can occur which might still continue on into the measuring time. In this case as well, by using the system based on fuzzy logic 12, either an immediate stopping of the balancing machine is possible, so that practically no measuring time is lost or else, depending on the circuitry of the system based on fuzzy logic 12, the measurement can be carried out, while maintaining an unbalance measured value which is independent of the interference oscillation in the start-up phase.

According to FIG. 2a, after the system based on fuzzy logic 12, an influenced signal 13 is conveyed to an adapter amplifier 14 and this is passed on as an adapted, influenced signal 21.

For the sake of clarification, in the influenced signal 13, a dotted range is indicated, which is intended to show once again that the system based on fuzzy logic 12 not only achieves a definite masking of the complete interference signal but also, to the extent possible, the interference signal is still utilized.

In the influence exerted by the system based on fuzzy logic 12 as shown in FIG. 2b, the measuring signal on the left at 6 which is provided with interference oscillations is first sent via an adapter amplifier 14, where it is accordingly amplified as an adapted signal 15, it is transmitted to the system based on fuzzy logic 12 and it leaves the system based on fuzzy logic 12 as an adapted influenced signal 21. Here, too, the dotted area shows the influence exerted by the system based on fuzzy logic 12.

According to FIG. 2c, the measuring signal on the left at 6 which is provided with an interference signal is first transmitted via the adapter amplifier 14 with the ensuing adapted signal 15 to a pre-filter 17 from which a pre-filtered signal 18 still having an interference is emitted. This signal is transmitted to the system based on fuzzy logic 12 and leaves this unit as an influenced signal 22. Here too, the dotted area indicates the influence of the system based on fuzzy logic 12.

Figure 3A:
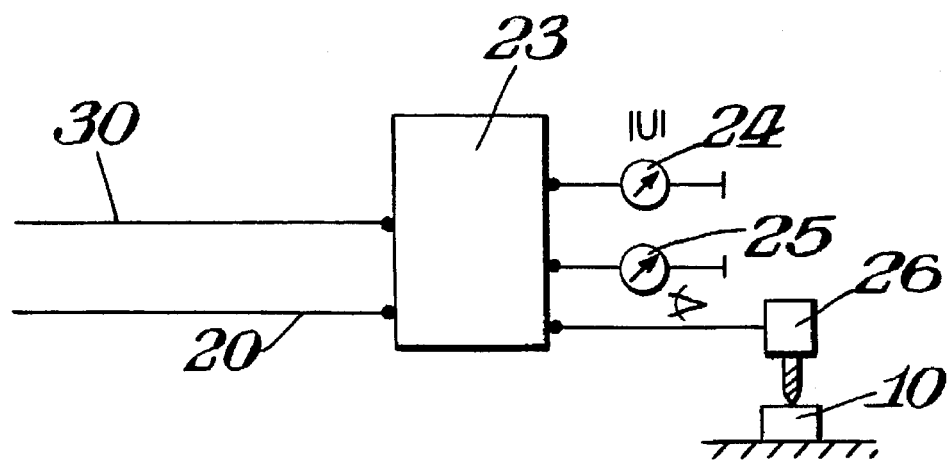
FIG. 3a is an arrangement for measured value processing with connected display and/or processing means for eliminating the ascertained unbalance.

FIG. 3a now shows examples of how the signals thus prepared are further processed in a device for measured value processing 23. The measuring signals 21 or 22 are transmitted via a line 30 to the device for the measured value processing 23. At the same time, an angle position pick-up signal 20 is likewise transmitted to the device for the measured value processing 23. The angle position pick-up signal 20 (see FIG. 1) is generated by means of an angle position pick-up 19 which is located, for example, on the drive motor 1.

After the information which comes via the line 30 with the angle position pick-up signal 20 is processed in the device for the measured value processing 23, the measured values for the unbalance according to FIG. 3a, for example, the amount for the unbalance in a magnitude display 24 are available at the outputs of the device for the measured value processing 23, and the information on the angle of the unbalance effect in relation to a zero mark on the balance object is indicated in a display device 25. Moreover, in addition to the display devices 24 and 25, there can also be a processing device 26 with which either, taking into account the magnitudes shown in the display devices, the unbalance of the rotatable object 10 is eliminated, namely, in one or two planes, or else, even without a display of the unbalance in terms of the angle position and magnitude, the processing device 26 can directly receive the unbalance results, so that the unbalance of the rotatable object 10 is eliminated, even without being displayed. Furthermore, instead of unbalance processing to be carried out by adding material or taking material away, it is possible, for example, by color coding, either to classify the rotatable object 10 into approved or rejected products, or else to provide a marking device which prints a number onto the compensation spot, thus prescribing which weight can be used at this place to compensate for the unbalance. It is also possible to have combinations of the described display and processing options so that, for example, for a wheel balancing machine, a polar display of the angle in a display device indicates the compensation weight, for instance, 20 grams, necessary to compensate for the unbalance.

Figure 3B:
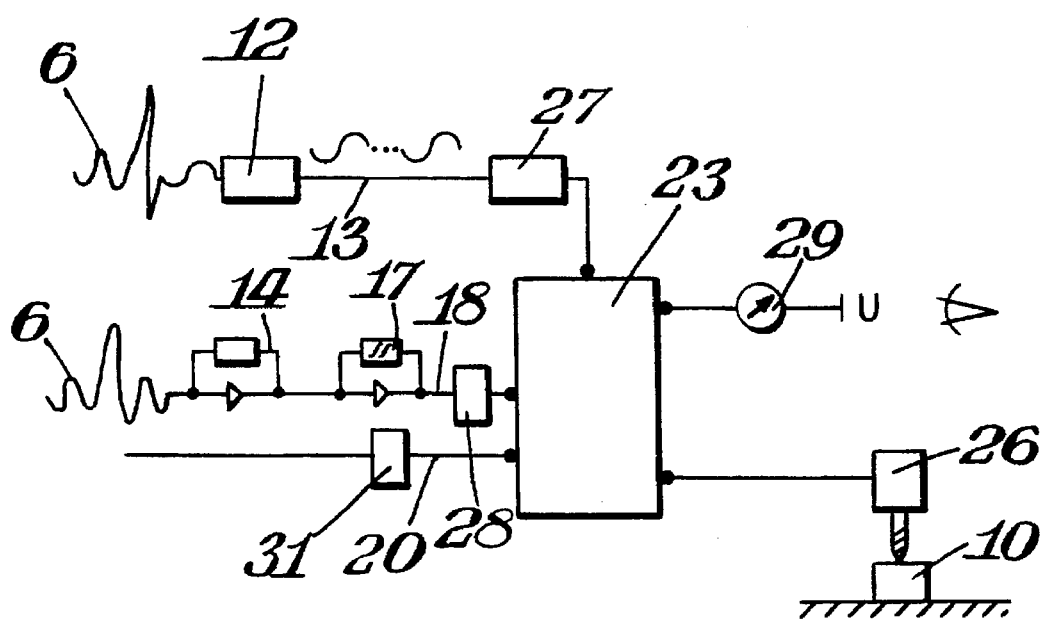
FIG. 3b is another arrangement for measured value processing in which the processing of the measured values is carried out as a function of the system based on fuzzy logic.

In the embodiment of measuring signal processing shown in FIG. 3b, the measuring signal on the left at 6, which has an interference, is transmitted to the device for measured value processing 23, first of all via the adapter amplifier 14 and the pre-filter 17 as a pre-filtered signal 18, and then, optionally via a buffer for an adapted pre-amplified signal 28, to the device for measured value processing 23.

The angle position pick-up signal 20 generated by the angle position pick-up 19 is likewise transmitted to this device for measured value processing 23, optionally via an intermediate buffer 31.

Furthermore, the measuring signal on the left at 6 having an interference is separately transmitted to the system based on fuzzy logic and it leaves this logic unit as an influenced signal 13, whereby here, too, the dotted area shows that not only switching functions on the basis of yes/no commands are carried out in the system based on fuzzy logic 12. This signal 13 influenced in this way is transmitted, optionally via a buffer 27 for the influenced signal 13, to the device for measured value processing 23.

In the device for measured value processing 23, as a function of the influenced signal 13, the position and magnitude of the unbalance is determined for the rotatable object 10 and, for example, displayed on a polar display 29 or else directly conveyed to the processing device 26 in order to render the rotatable object 10 free of unbalance by adding material or taking material away in at least one plane.

In the embodiment according to FIG. 3b, the use of buffers 27, 28 and 31 can serve to carry out the unbalance measurement and the necessary unbalance compensation of the rotatable object 10 in separate places and thus also at different point in time. With such buffers, it is also possible to exert an influence on any possible different availability times of the signals.

Figure 4:
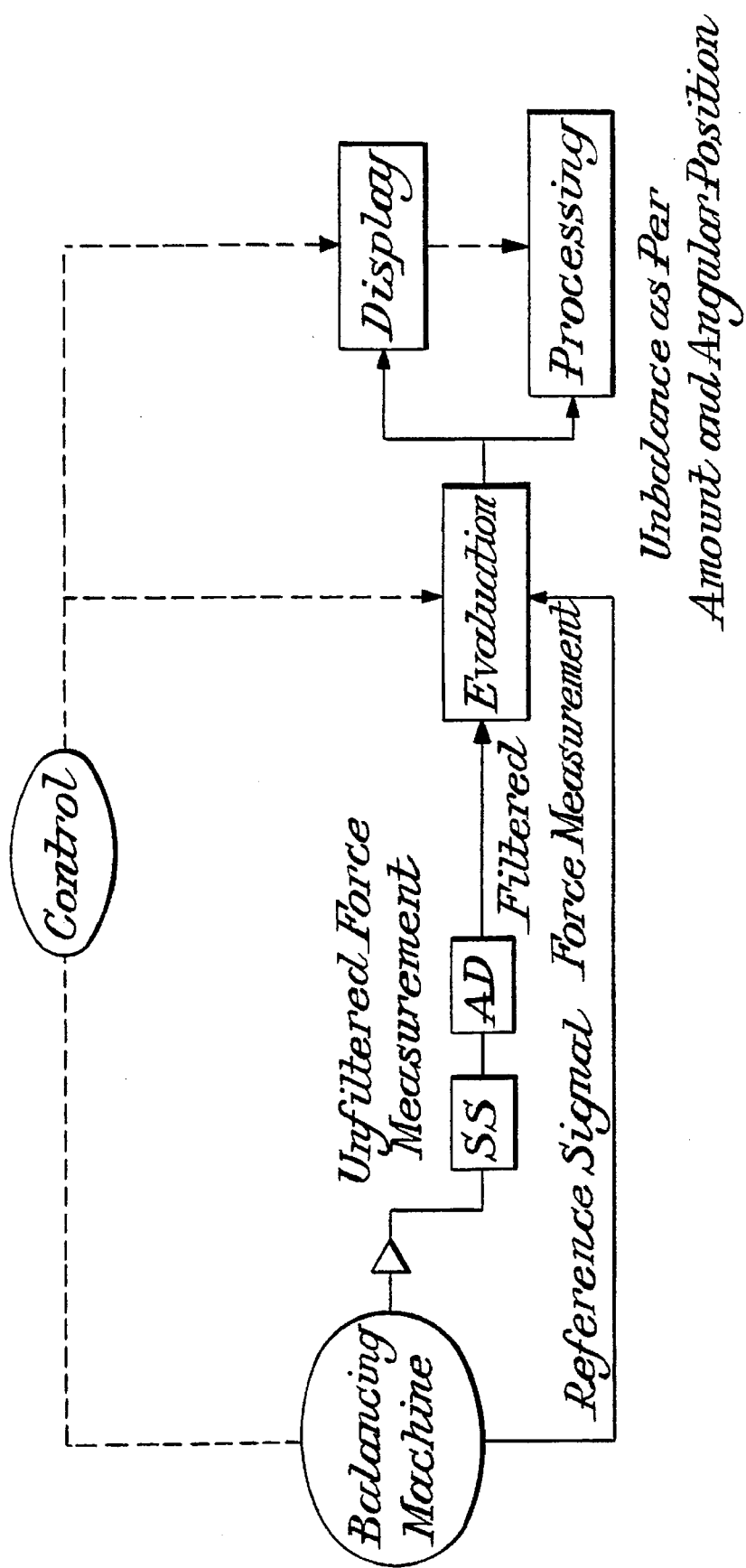
FIG. 4 is a diagrammatic view illustrating the principle of unbalance measurement.

FIG. 4 shows the principle of unbalance measurement of balancing machines following the state of the art under consideration as far as it is relevant for the task. The output signal of a force transducer can be filtered by an anti-aliasing filter SS in case of low sampling rates. In the evaluation unit, the force signal is correlated to a reference signal derived from the revolution of a rotor and amount and angular position of unbalance are determined in well known manner.

Figure 5:
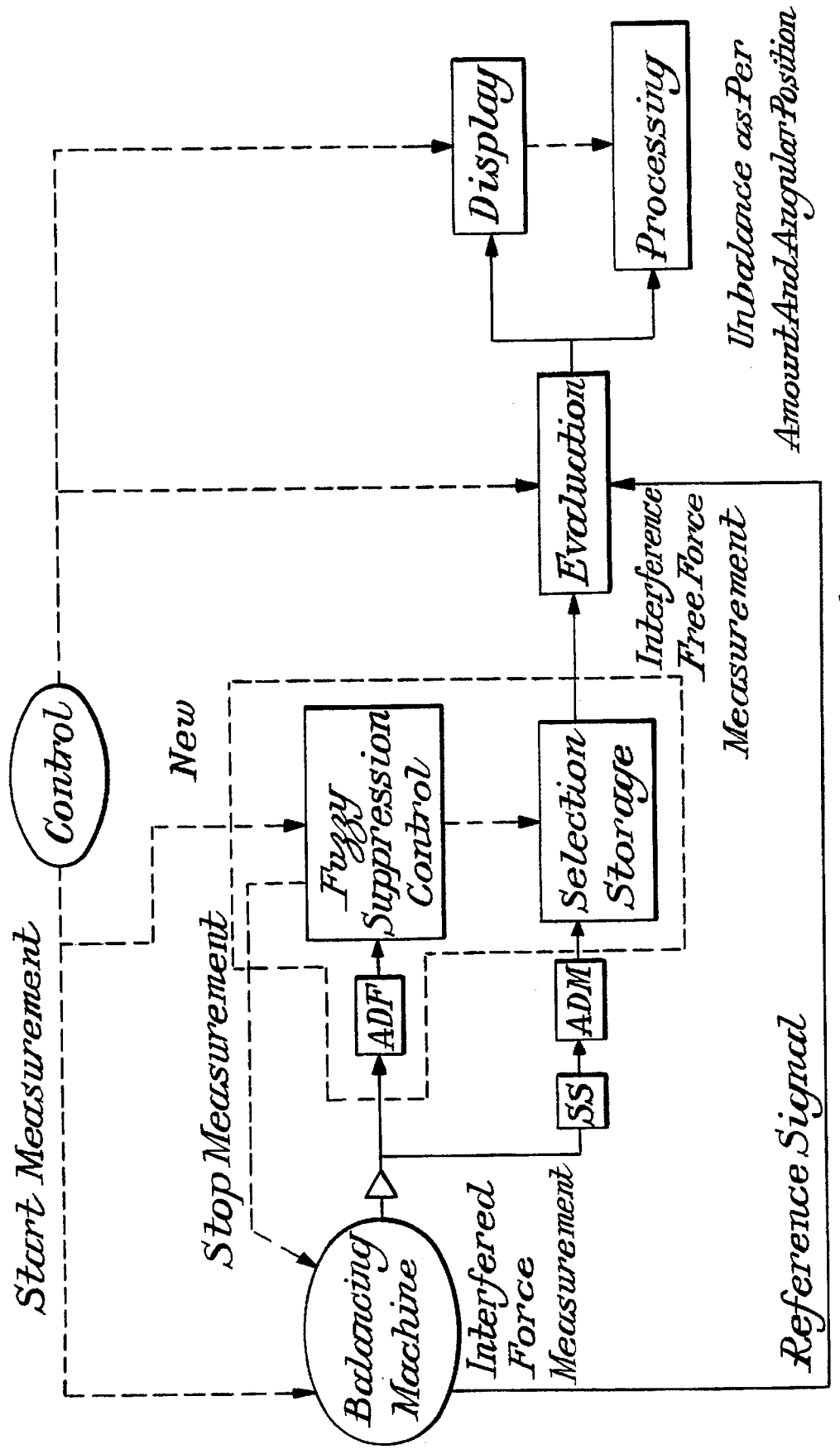
FIG. 5, 6A, B, C, D, 7 and 8A, B are diagrammatic views illustrating the principle of the fuzzy logic suppression control.

FIG. 5 illustrates the inventive principle of fuzzy logic suppression control. If, in case of low sampling rates anti-aliasing filters are applied, the filtered measured values are transmitted to evaluation whereas unfiltered measured values are used to recognize interferences. This figure, in which anti-aliasing filtering is provided, shows a block diagram of one embodiment of a system for detection and suppression of interferences. In known systems as such of FIG. 4 the interfered measured variable force signal is read in the computer after having passed the anti-aliasing filter SS and the analog/digital converter AD. In the system according to the invention the variable first passes a selection and storage unit where the filtered values for a complete rotor revolution are stored. The selection and storage unit supplies only interference-free measured filtered values to the subsequent evaluation unit. This evaluation unit is the same as for the known systems.

A fuzzy logic suppression control decides whether the current measured values are to be passed for evaluation, whether single current measured values are to be replaced by previous interference-free values from the storage or whether the entire revolution is to be suppressed.

Figure 6D:
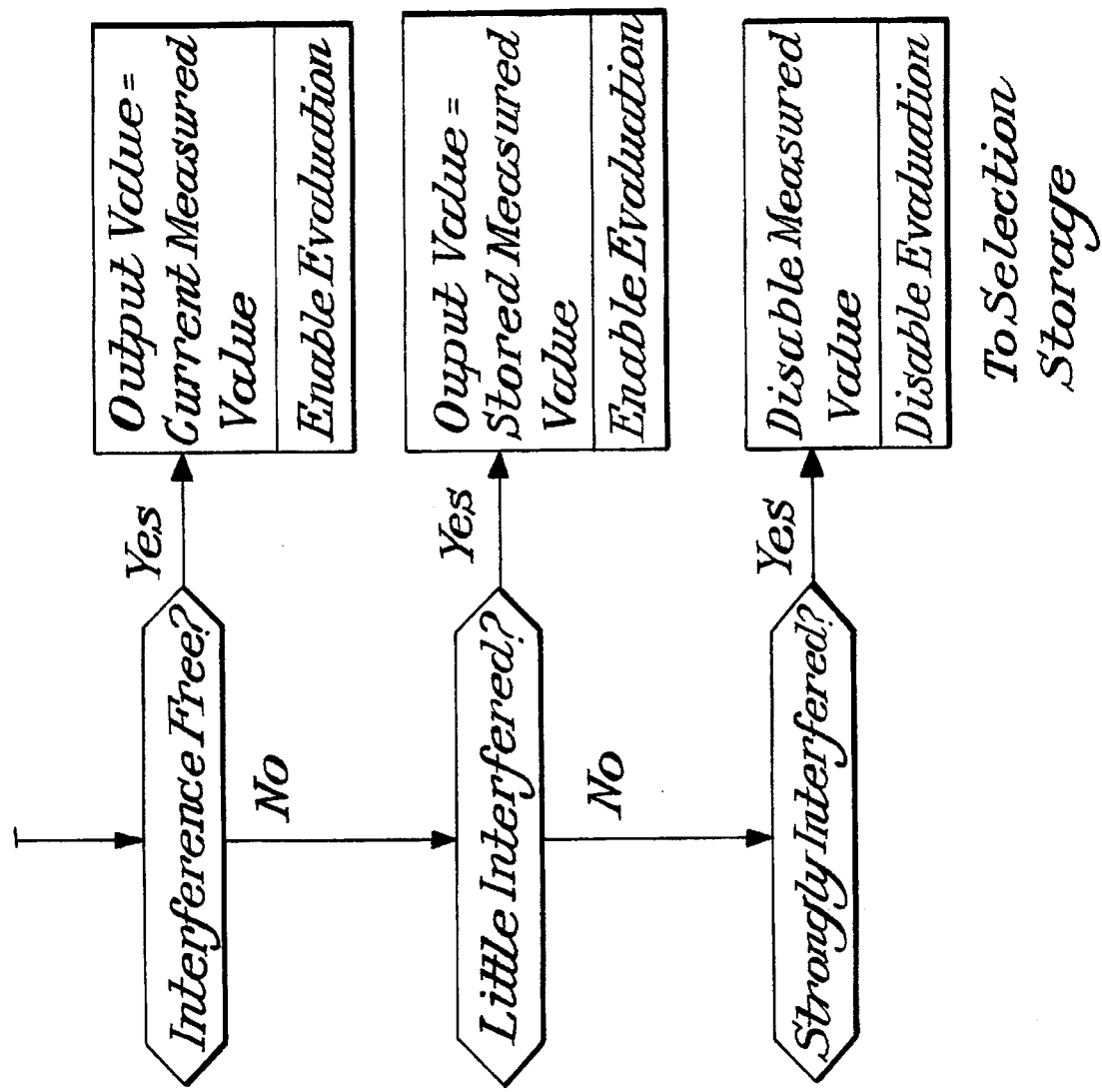

The fuzzy logic suppression control receives as its input variable the unfiltered measured values from the analog/digital converter ADF. After processing this input as shown in FIG. 6C it supplies as its output in each sampling stage one of the three control signals:

1) output value=current filtered measured value;
2) output value=stored filtered measured value;
3) disable filtered measured value and disable evaluation The filtered measured values of an entire revolution are stored and thereafter transfered to the evaluation unit.

The measured values of the first revolution are used only for comparison and stored without being used for unbalance determination. The recording of these comparison values can be made starting at a certain percentage, for example 90% of the final speed. Should it become necessary for accuracy reasons, also the second revolution can be used as reference. During this second revolution, the error monitoring would be active, no measured values for further processing, however, would be available.

If comparison of the results of the first revolutions shows continuing deviations between allocated unfiltered measured values, the respective last revolution is used as a basis for comparison in at least one further revolution measuring run, i.e. with continuing interferences the last revolution is used for comparison. In the case of decreasing interferences, the second last revolution is used a basis of comparison for all further revolutions.

The fuzzy suppression control unit stores the unfiltered measured values for a complete revolution coming from analog/digital converter ADF. During each sampling step the current unfiltered measured value is compared with the corresponding unfiltered value of the same angular position of the previous revolution. The result of comparison is given be the Delta measured value. Three fuzzy functions, i.e. small, medium and large, are formed as shown in the representation "Degree of membership/Delta measured value" of FIG. 6A and thus fuzzy input variable "Delta measured value" is achieved.

The fuzzified Delta measured value is supplied to a counting-device as shown in FIG. 6C. The initial value of the counter is 0. The counter is increased with each interference-free unfiltered measured value and decreased with each interfered one. Thus the contents of the counter is a measure for the quality of the unfiltered measured values in the history. The counter is implemented as an integrator that is limited downward to zero and upward to a maximum value. The counter is preferably assumed to reach the maximum value after two interference-free revolutions. The increments in upward and downward counting can be different. In this way, interferences influence the quality grading much stronger than interference-free values. The output of the counting-device is an intermediate (fuzzy) variable with membership functions, as shown in FIG. 6C.

Figure 8A:
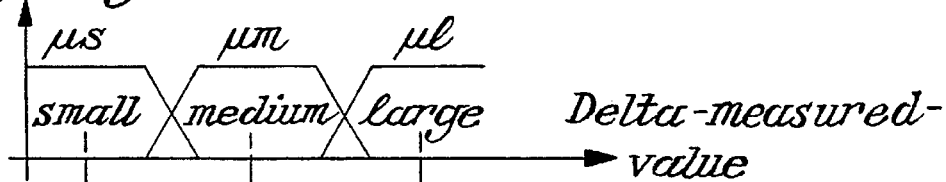
Figure 8A:
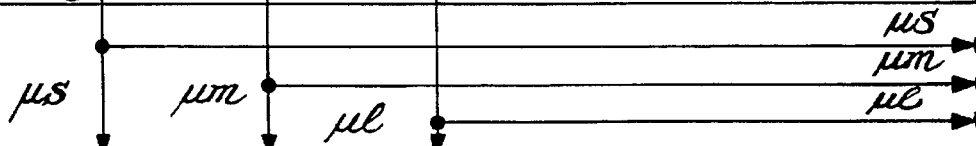
Figure 8A:
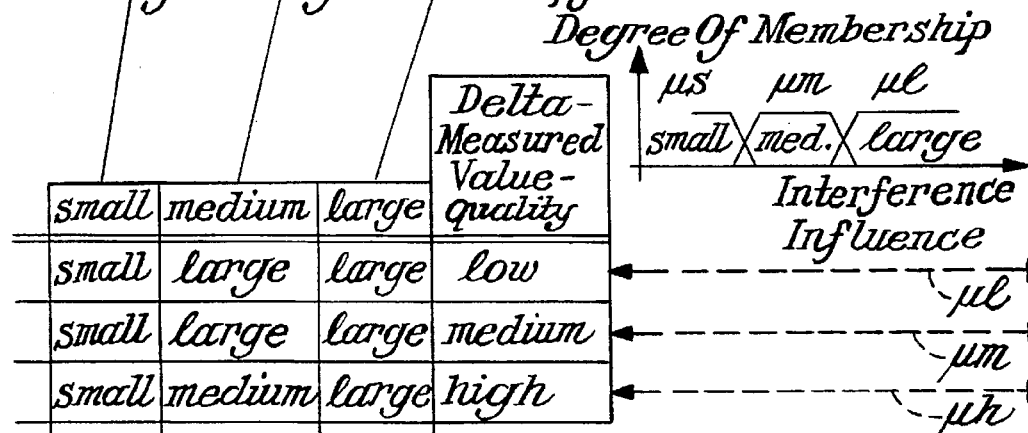

Tp achieve the fuzzy input variable "delta Measured value", the difference between current measured value and responding value of the last revolution is fuzzified with respect to the three membership functions small, medium and large as shown in FIG. 6A. FIGS. 8A, B also illustrate the above described principles.

Fuzzy input variable "Delta measured value" on one hand and intermediate variable "Quality" on the other hand are transfered to a logic unit forming fuzzy variable "interference influence" in a logic matrix. The fuzzy functions are shown in FIG. 6B "Degree of membership/Interference influence". Subsequent defuzzification supplies output variable "interference evaluation" which assumes one of values interference-free/little interfered/strongly interfered as shown in FIG. 6B of diagram "Degree of membership/ interference evaluation".

In the case of "interference-free", the corresponding filtered measured value stored in the selection storage is considered to be interference-free and is enabled in the evaluation unit.

In the case of "strongly interfered", the corresponding filtered value is considered to be interfered and is disabled.

In the case of "little interfered", the result of which has been achieved under inclusion of the history through the middle line of the logic matrix for the interference influence, the previous filtered value stored in the selection storage is made available to the evaluation unit.

Under reference to the Delta measured values this means in other words: Should these values be almost identical, the corresponding filtered measured value in the selection storage is considered to be interference-free and is enabled in the evaluation unit. In the case of large deviations the corresponding filtered value is considered to be interfered and is disabled. In the case of mean deviations the history is considered. If the measurement has already been strongly interfered, the filtered value is disabled, in the case of an almost interference-free procedure, the filtered value not interfered of the last revolution is processed as the current filtered value. In this case, the current filtered value—considered to be partly interfered—is not stored in the selection storage unit, but the previous filtered value is maintained. In all other cases, the current filtered value overwrites the stored value of the previous revolution.

This means in cases found in the most upper and most lower line of the logic matrix for interference influence:

1) Interference-free operation

The comparable pairs of measured values coincide. Quality quickly reaches the maximum value. The measurement is carried out without interruption. The measuring time is limited to the absolutely necessary minimum.

2) Continuously interfered operation

The measurement is disabled. The angular position of the first disabled measuring point is stored in order to continue the transmission of the measured values in this point after an elimination of the interference. At the occurring of the interference, the quality has reached a determined value and decreases rapidly.

Since only complete revolutions of the rotor can be processed, either complete revolutions must be suppressed or missing measured values must be replaced by values of previous revolutions considered to be interference-free.

The measured values are counted and the measurement is completed with a positive result if a preset minimum number of interference-free measured values is reached. In the case of disabled measurement, monitoring is made by means of timeout. If the time of disabling exceeds a preset maximum time, the measurement is interrupted with a negative result. If at timeout only few measured values are missing and the measuring has almost been interference-free, the last missing values are replaced by values from the storage and the measurement is completed with a positive result.

During balancing in two planes both force signals, independent of each other, can be subject to interferences. The described interference detection and suppression is to be made twice and identically for both measuring paths.

Figure 7:
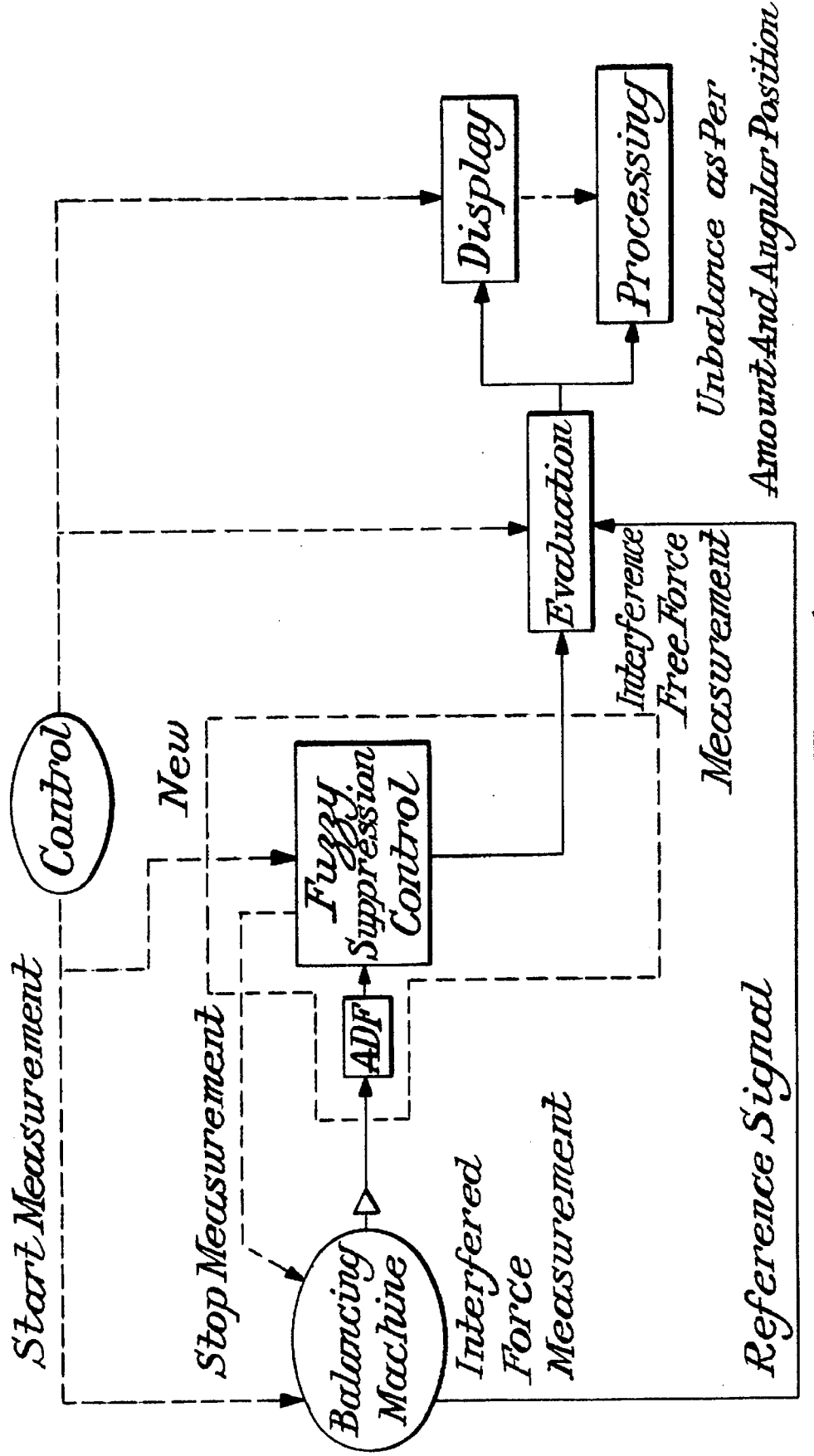

Antialiasing filter SS is not necessary in the case of a device according to FIG. 5 on condition that the selected sampling rate is sufficiently high. In this case, the modules of antialiasing filter SS, analog/digital converter ADM and the selection storage for the filtered values of one revolution of FIG. 5 will not be necessary as shown in FIG. 7. Instead, the unfiltered measured values supplied to and stored in the fuzzy suppression control unit are transfered to the evaluation unit.

The principles of fuzzy logic are explained in

1) Hans-Peter Preuβ, Karlsruhe: Fuzzy control—heuristische Regelung mittels unscharfer Logik (Fuzzy Control—heuristic control through fuzzy logic); Parts 1 and 2; atp—Automatisierungstechnische Praxis 34 (1992), Brochure 4, pages 176 to 184 and Brochure 5, pages 239 to 246;

2) Günther Trautzl: Mit Fuzzy-Logik näher zur Natur? (Simulating natural conditions by using fuzzy logic?); Elektronik 9/1991; pages 48 to 53;

3) Dubois, D. and Prade, H.: Fuzzy Sets and Systems, Academic Press, New York 1980;

4) Zimmermann, H. J.: Fuzzy Set Theory—and Its Applications, Kluwer-Nijhoff Publishing, Boston 1991;

and these references are incorporated herein by reference.

What is claimed is:

1. A process for determining any unbalance of a rotating body comprising the steps of obtaining an unbalance signal and masking measured deviating values as non-relevant in the unbalance signal utilizing a system based on fuzzy logic that recognizes and masks non-relevant portions of the unbalance measuring signal that deviate from roughly expected signals.

2. A process for determining any unbalance of a rotating body comprising the steps of evaluating unbalance measuring signals of a series of measuring signals from a plurality of individual measuring signals picked up as a function of rotational angle, comparing present unbalance signals with unbalance signals previously picked up, determining by fuzzy logic those signals influenced by disturbances which fall above limit values, and excluding signals from further evaluation that fall above the limit values.

3. A process as in claim 2 wherein unbalance measuring signals which lie below the limit values are released for evaluation, unbalance measuring signals which lie above the limit values are excluded from evaluation, and in that with unbalance measuring signals which lie within the limit values a decision on exclusion is made as a function of a quality level.

4. A process as in claim 3 wherein the quality level is determined by counting undisturbed and disturbed unbalance measuring signals.

5. An apparatus for determining the unbalance of a rotatable object in at least one measuring plane comprising at least one oscillation transducer for measuring the magnitude of unbalance and producing unbalance measuring signals, at least one angle position pick-up for determining the position of the unbalance in the object, a display device for displaying the unbalance in terms of position and magnitude, and a processing device for processing the unbalance measuring signals from the oscillation transducer by a system based on fuzzy logic to mask any non-relevant portions of the unbalance measuring signals which deviate from roughly expected signals.

6. An apparatus according to claim 5 further comprising at least one amplifier for amplifying the unbalance measuring signals, said at least one amplifier connected between the output of the oscillation transducer and the input of the system based on fuzzy logic.

7. An apparatus according to claim 6 further comprising a pre-filtering device immediately after the amplifier, and in that the output of this pre-filtering device emits the unbalance measuring signal to the system based on fuzzy logic in order to process this unbalance measuring signal to mask any non-relevant portions of the unbalance measuring signals which deviate from roughly expected signals.

* * * * *

UNITED STATES PATENT AND TRADEMARK OFFICE
CERTIFICATE OF CORRECTION

PATENT NO. : 5,661,672
DATED : August 26, 1997
INVENTOR(S) : Peter Gnielka, et al.

It is certified that error appears in the above-identified patent and that said Letters Patent is hereby corrected as shown below:

IN THE TITLE: On the cover page, and at column 1, line 1, "FOR" should read -- TO --.

Column 8, line 23, "be" should read -- by --; and line 44, "Tp" should read -- To --.

Signed and Sealed this

Second Day of December, 1997

*Attest:*

BRUCE LEHMAN

*Attesting Officer*   Commissioner of Patents and Trademarks